US010530756B1

(12) United States Patent
Youngs et al.

(10) Patent No.: US 10,530,756 B1
(45) Date of Patent: Jan. 7, 2020

(54) PROFILE-DELETION CONTROL FOR AN EMBEDDED UNIVERSAL INTEGRATED CIRCUIT CARD

(71) Applicant: Sprint Spectrum L.P., Overland Park, KS (US)

(72) Inventors: Simon Youngs, Overland Park, KS (US); David W. Holmes, Sammamish, WA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/872,808

(22) Filed: Jan. 16, 2018

(51) Int. Cl.
| | |
|---|---|
| *H04L 9/00* | (2006.01) |
| *H04L 29/06* | (2006.01) |
| *H04B 1/3816* | (2015.01) |
| *H04L 9/32* | (2006.01) |
| *H04W 12/04* | (2009.01) |
| *H04W 4/70* | (2018.01) |
| *H04W 8/18* | (2009.01) |
| *H04L 29/08* | (2006.01) |
| *G06F 16/23* | (2019.01) |

(52) U.S. Cl.
CPC ............ *H04L 63/068* (2013.01); *G06F 16/23* (2019.01); *H04B 1/3816* (2013.01); *H04L 9/3268* (2013.01); *H04L 29/06* (2013.01); *H04L 67/30* (2013.01); *H04W 4/70* (2018.02); *H04W 8/183* (2013.01); *H04W 12/04* (2013.01)

(58) Field of Classification Search
CPC ..... H04L 29/08; H04L 63/068; H04L 9/3268; H04L 29/06; H04L 67/30; H04W 4/70; H04W 8/183; H04W 12/04; G06F 16/23; H04B 1/3816
USPC .......................................................... 235/441
See application file for complete search history.

(56) References Cited

U.S. PATENT DOCUMENTS

| | | | | |
|---|---|---|---|---|
| 2016/0140358 A1* | 5/2016 | Lee | .......................... | G06F 15/16 |
| | | | | 726/7 |
| 2016/0352698 A1* | 12/2016 | Long | ..................... | H04W 12/08 |
| 2017/0034699 A1* | 2/2017 | Michel | ................... | H04W 12/06 |
| 2017/0280320 A1* | 9/2017 | Caceres | .................. | H04W 8/24 |
| 2018/0041601 A1* | 2/2018 | Park | ...................... | H04W 88/02 |

\* cited by examiner

*Primary Examiner* — Daniel A Hess

(57) ABSTRACT

An eUICC is configured with one or more master delete keys each allowing an associated level of profile-deletion access for deleting one or more profiles from the eUICC, and the eUICC is configured to control profile-deletion access in accordance with the one or more delete keys. For instance, one delete key could allow deletion of any or all profiles on the eUICC including any operational profiles (e.g., MNO profiles) and any non-operational profiles. Whereas, another delete key could allow deletion of any or all operational profiles but not any non-operational profiles. Further, a blockchain protocol could be used to securely convey such a delete key from one party to another, helping to establish chain of custody of the delete key.

4 Claims, 2 Drawing Sheets

PROFILE-DELETION CONTROL FOR AN EMBEDDED UNIVERSAL INTEGRATED CIRCUIT CARD

BACKGROUND

Mobile communication devices, such as cell phones, tablet computers, and other devices, are typically configured to use universal integrated circuit cards (UICCs), each of which includes a microprocessor and storage for holding a mobile network operator (MNO) service/subscription profile. Traditionally, these UICCs were configured to be removably inserted into a UICC-bay of a mobile device and would store a single MNO profile in read only memory (ROM), enabling the mobile device to be served by a single associated MNO. Such UICCs, with access subscription data, are commonly known as SIMs (Subscriber Identity Modules, or "Subscription" Identity Modules). Recently, however, the industry has introduced an embedded version of the UICC (eUICC), which can be permanently soldered to the system board of the mobile device at the time of manufacture. Advantageously, the eUICC allows MNO profiles to be downloaded over the air and enabled when required, thereby enabling a change from one MNO profile to another (e.g., through a device user interface) without the need to physically swap the UICC. These eUICCs can be relatively inexpensive to manufacture, and with their small size, may be optimal for various uses, including for instance in the growing Internet of Things (IoT) market.

OVERVIEW

An eUICC includes a processing unit (e.g., microprocessor) and storage for holding data defining program instructions, profiles, and other reference information. The program instructions define an operating system as well as other program modules for managing storage and use of profiles.

Each profile stored on the eUICC comprises data and/or applets that a profile handler (e.g., local profile assistant (LPA)) could interpret and apply. The contents of a profile that are used by the radio modem in the device are of the same form as those traditionally contained within a SIM. These profiles could include "operational profiles" and "non-operational profiles".

An operational profile is specific to a given MNO and a given service subscription for the mobile device with that MNO. As such, the operational profile contains data and application logic that enables the mobile device to be served by that MNO in accordance with a service subscription. The operational profile could contain one or more network access applications (providing authorization to access an MNO network) and associated network access credentials (data such as an international mobile subscriber identity (IMSI) and one or more security keys required for authenticating to an MNO network), and various MNO applications and/or third party applications, as well as a profile ID (ICC-ID).

When an operational profile is enabled on a mobile device's eUICC, the eUICC applies that operational profile to allow the mobile device to be served by the associated MNO in accordance with the associated service subscription. For instance, when the mobile device enters into coverage of the MNO's network, the eUICC could interact with an MNO authentication center to authenticate the mobile device for service. And other logic on in the operational profile could be applied to limit or define the scope of allowed service or other associated functions.

A non-operational profile, on the other hand, is not specific to a given MNO service subscription, and may not even be specific to a given MNO, but may still enable communication service by the mobile device. A representative example of a non-operational profile is a "provisioning profile," which provides for mobile device connectivity to facilitate adding an account and downloading a new operational profile. As such, the provisioning profile could contain one or more network access applications and associated network access credentials but could be configured for access only to a network-based subscription manager for purposes of providing eUICC management and profile management. For instance, the provisioning profile could enable the mobile device to communicate with the subscription manager for purposes of downloading one or more operational profiles to the eUICC. Another example of a non-operational profile is a "test profile," which could be enabled on the eUICC by the eUICC original equipment manufacturer (OEM) or others, and could contain a dummy subscription profile or the like, to facilitate testing the eUICC and device.

The eUICC operating system could be configured, through suitable program instructions executable by the eUICC processing unit, to allow only one profile to be enabled at any given time. That is, the eUICC could contain multiple profiles, but the operating system could be configured to give effect to just one of the profiles at a time, such as by flagging or otherwise designating a single one of the profiles as enabled and flagging or otherwise designating each of one or more other profiles as disabled.

At the time of eUICC and/or device manufacture or initial distribution, the eUICC could contain one or more non-operational profiles, such as a provisioning profile and a test profile, and may contain no operational profiles. For instance, the eUICC OEM could initially configure the eUICC with a provisioning profile and could set the eUICC with a designation that the provisioning profile is enabled. The host device could then engage in communication with a subscription manager in accordance with the provisioning profile, to download a new MNO profile (operational profile), and the eUICC operating system could disable the provisioning profile and enable the newly downloaded MNO profile, so that the device could then engage in service in accordance with the MNO profile.

More particularly, when a user (e.g., individual or enterprise) interacts with an MNO to establish a service subscription for the device, the MNO could then use or interwork with a subscription manager data preparation (SM-DP+) to generate an MNO profile for the device. Through interaction with the device (e.g., upon user entry to the device of a matching code established for the new MNO profile), a local profile discovery component of the eUICC could engage in communication with a subscription manager discovery service (SM-DS) in accordance with a provisioning profile, to download the new MNO profile from the SM-DP+. And the eUICC could then store the obtained MNO profile for use and could enable the MNO profile and disable the provisioning profile. At this stage, the eUICC would thus contain at least the disabled provisioning profile and the enabled new MNO profile, and the mobile device could engage in communication service in accordance with the enabled MNO profile.

If and when appropriate (e.g., after service contract expiration), the device user may then establish a service subscription with a new MNO and terminate the subscription with the existing MNO. In this process, the new MNO could then likewise generate an MNO profile for the device, and the eUICC could download and store the new MNO profile. Further, the eUICC could enable the new MNO profile and disable the other MNO profile. Thus, at this stage, the eUICC would contain at least the disabled provisioning profile (if provided) and the two MNO profiles, with one MNO profile set as disabled and the other MNO profile set as enabled. The mobile device could then engage in communication service in accordance with the newly enabled MNO profile.

When an MNO downloads a profile to an eUICC, the MNO could be considered the profile owner, and security parameters could be set in the eUICC (e.g., securely stored and managed by an Embedded UICC Controlling Authority Security Domain (ECASD)) to allow secure communication between the MNO and the eUICC (e.g., between an SM-DP+ and the eUICC) with respect to the downloaded MNO profile. Through this secure communication, the MNO could then securely manage the contents of the profile, so as to make profile changes when desired.

Each profile on the eUICC could be provisioned with one or more profile policy rules (PPRs), which could govern use and management of the profile. The entity (e.g., OEM or MNO) that downloads or otherwise adds a profile onto the eUICC could include and/or subsequently provision one or more PPRs as part of the profile, and the eUICC operating system, through a profile policy handler (PPH) component, could be configured to enforce the PPRs of installed profiles. For instance, through interaction with an SM-DP+, an MNO could set a PPR within or otherwise for a profile that the MNO initially downloads to the eUICC. Further, through secure communication as noted above, the MNO could then later communicate with the eUICC to manage the profile and, through that communication, could set a PPR for the profile. In either case, the eUICC PPH could then note that the eUICC has the PPR set and could then enforce the PPR for the profile. In addition, the MNO as profile owner could also communicate with the eUICC to unset a PPR that was previously set for the profile.

Examples of these PPRs include "Do Not Disable" (PPR1) and "Do Not Delete" (PPR2).

If PPR1 is set for an MNO profile that is enabled on the eUICC, then the eUICC operating system would be set to not allow that MNO profile to be disabled. This could be useful in a scenario where the MNO has subsidized and/or is leasing the device, as PPR1 could help ensure that the MNO's profile on the device is not replaced with another MNO's profile. That is, as the eUICC would allow only one MNO profile to be enabled at a time, PPR1 set on a currently enabled MNO profile would prevent disablement of that MNO profile and would thus prevent enablement of a different MNO profile.

If PPR2 is set for an MNO profile, on the other hand, then the eUICC operating system would be set to not allow that MNO profile to be deleted. This could be a further level of protection for an MNO who is subsidizing or leasing the device, as PPR2 could help avoid letting a user bypass PPR1 for an enabled MNO profile by simply deleting the profile.

Notwithstanding PPR1 and PPR2, the act of resetting the eUICC (e.g., "resetting to factory default" via a user interface or, in the case of an OEM refurbishing the eUICC, via a direct connection) could result in deletion of profiles and perhaps other data on the eUICC. Recognizing that this could allow a user to bypass PPR2 and thus PPR1 for an enabled MNO profile, the industry may define another policy profile rule: "Do Not Delete on eUICC Reset" (PPR4). If the eUICC is configured with logic to support PPR4, then an MNO owner of a profile could thus provision PPR4 for the profile to help avoid letting a user bypass PPR2 and PPR1 for that profile, as yet a further level of protection. With PPR4 set for a profile, the eUICC operating system would then be configured such that even if when the eUICC is reset, the eUICC would maintain that profile, rather than deleting that profile. In effect, PPR4 would thus qualify the reset functionality of the eUICC with respect to that profile, to help ensure that the profile remains in place on the eUICC. And if that profile was enabled before the UICC was reset, it would remain enabled.

If an MNO has set PPR4 for a profile, thus preventing deleting of the profile by reset, however, situations could arise where it would still be necessary to remove the PPR4 limitation for a profile on the eUICC. For example, if a device user is traveling and buys a local service subscription from an MNO while traveling abroad, that MNO might download a profile to the user's device and set PPR4 for the profile. Upon return to their home country, the user could then discover that the device is "locked" to that foreign MNO's service. As another example, if the MNO has downloaded a profile to a user's device and has set PPR4 for that profile, and if that MNO goes out of business, its security credentials for accessing and managing the downloaded profile could be lost, so the device could permanently locked to the MNO and have no access to service.

One possible solution to this problem is to allow any SM-DP+ to unset PPR4 in a profile, so as to allow a user to remove the profile using eUICC reset. However, this solution is itself problematic, as it could allow unscrupulous MNOs to "unlock" devices, thereby bypassing the PPR4 profile lock put in place by a proper MNO profile owner. Consequently, an improvement is desired.

The present disclosure provides for granting special profile-delete access to an "owner" of the mobile device.

The "owner" of the mobile device could be the leasing/subsidizing MNO for a leased or subsidized device, until the customer has fulfilled an associated contract such as with required payment. Alternatively, the "owner" of the mobile device could be an enterprise or end-user, if the enterprise or end-user has properly acquired title to the device (e.g., has fulfilled any applicable subsidy/leasing contract). In various implementations, the owner of the device could thus also be considered a title-holder of the device.

According to the present disclosure, the eUICC could be configured with a device-specific Master Delete Key (MDK) that a device owner can use as a key to delete one or more profiles on the eUICC, including a profile that is set to not be deleted (e.g., with PPR2 and/or PPR4). In an example implementation, this MDK could be a master "reset" key that enables the owner to reset the eUICC in a manner that would delete at least any operational profiles downloaded to the eUICC since manufacture.

Further, the disclosure provides for an eUICC being configured with multiple such MDKs, each having a different respective scope or level of profile-deletion access. One such MDK, for instance, might allow deletion from the eUICC of all profiles including any operational profiles and any non-operational profiles. Whereas another such MDK might allow deletion from the eUICC of any or all operational profiles but not any non-operational profiles. These MDKs could be provided to parties so as to enable different respective levels of profile-deletion capability. For instance, an OEM could maintain an MDK that allows deletion of all profiles from the eUICC, whereas a device owner could be provided with an MDK that allows deletion of just operational profiles from the eUICC.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
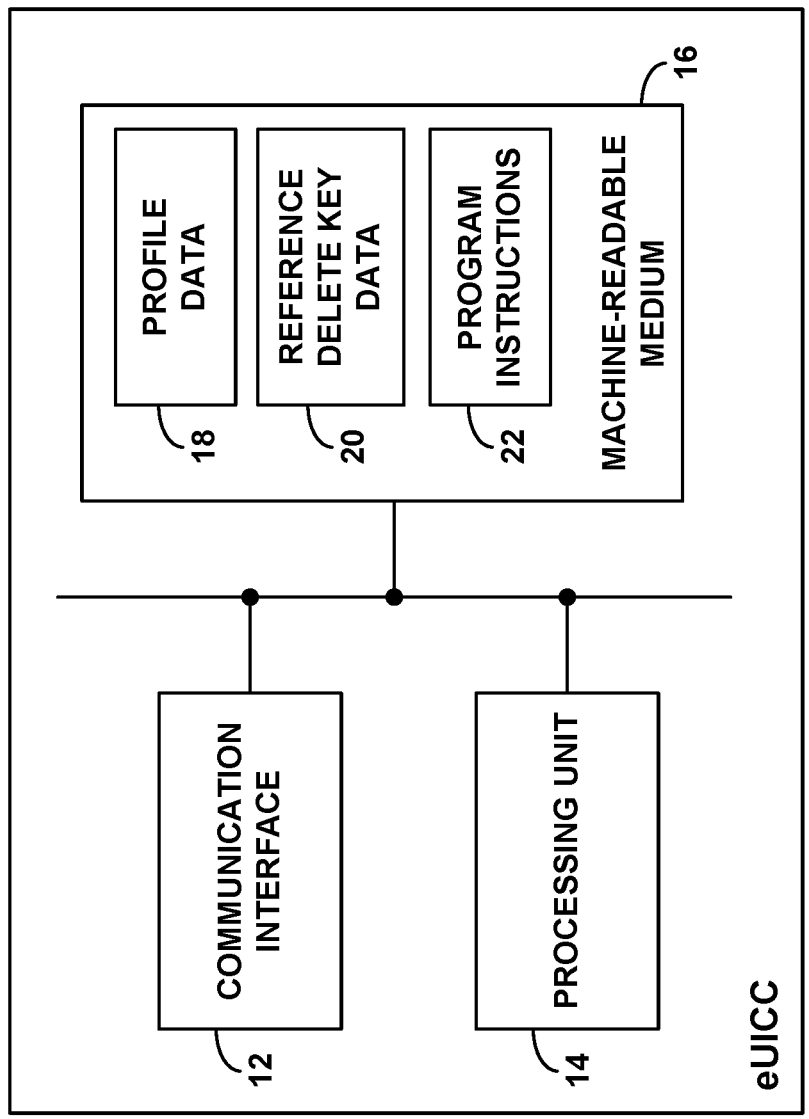
FIG. 1 is a simplified block diagram showing some of the components of an example eUICC in accordance with the disclosure.

At manufacture, the device OEM or eUICC OEM could create an MDK for the eUICC and could securely store the MDK in the device and/or eUICC and provide the MDK for receipt and use by a device owner. In practice, the MDK could be a truly random number, generated based on a random noise seed, so that the MDK cannot be derived algorithmically from the device identifier, eUICC identifier, or the like.

Upon generation of the MDK, the OEM could securely store the MDK within the eUICC, such as within the ECASD or other eUICC component, preferably in a manner such that the MDK cannot be extracted from the eUICC. Thus, the eUICC would securely store the MDK and would not output the MDK. Further, at the time of initial device distribution, the OEM could provide the MDK to the device owner, such as in a wholesale arrangement to a distributor and/or MNO. For instance, the OEM could specify the key within device packaging or, in the case of bulk supply (e.g., to an MNO or enterprise customer), in a secured database.

Further, the eUICC could be configured to receive input of the MDK and, in response to the MDK being entered, allow deletion of at least one or more operational profiles downloaded to the eUICC, including an operational profile that is set with a PPR or PPR combination that specifies the profile should not be deleted even on UICC reset (e.g., PPR2 and PPR4). For instance, the operating system could be configured to receive input of a profile-deletion request entered via a local user interface of the host device and, if a delete key is not provided with that request, to prompt for entry of a delete-key. Upon receipt of a delete key for the profile-deletion request, the operating system could then determine whether the delete key matches the MDK for the device. For instance, the operating system could query or otherwise reference data in the ECASD or other eUICC component that securely holds the MDK, to determine if the received delete key matches the MDK. If so, then the operating system could then grant the profile-deletion request such as by deleting one or more operational profiles stored on the eUICC, including perhaps one or more operational profiles that are set to not be deleted. Whereas, if not, then the operating system could reject the profile-deletion request and thus not delete operational profiles, at least not any operational profile that is set to not be deleted.

Advantageously, providing the MDK to the device owner could appropriately allow the device owner to exert control over deletion from the eUICC of operational profiles including any that are set to not be deleted. In the case of a subsidized, leased, or enterprise-owned device, for instance, the holder of legal title to the device could be the MNO or an enterprise, and that MNO or enterprise could thus exert control over whether operational profiles that are set to not be deleted can be deleted. Further, once title passes to an end-user, enterprise, or other party, that other party could then exert similar control over whether operational profiles that are set to not be deleted can be deleted.

Note that if the device owner is other than the MNO that downloaded a profile and set the profile to not be deleted, and if the device owner loses the MDK, the device owner would then be unable to delete the profile at issue. However, the MNO that downloaded the profile to the device could still unset the profile rule that prevented deletion and could thus free up the device for use on other networks.

Note also that the MDK key matching process could involve checking for an exact match between the entered delete-key and the securely stored MDK. Alternatively, the keys could be asymmetric, and a suitable asymmetric security algorithm could be applied to determine whether the entered delete-key matches, as a basis to grant the deletion-request. The key that is provided to the device owner could still be considered an MDK, and the key securely stored in the MDK could be identical to that provided to the device owner (requiring an exact match), or the key securely stored in the MDK may be related algorithmically to the MDK held by the device owner (requiring an algorithmic match). Other arrangements are possible as well.

And further, note that the MDK could be communicated to the device owner through use of a blockchain protocol, which could be born at the point of manufacture when the MDK is generated and stored securely in the device/eUICC.

For instance, when the eUICC manufacturer initially manufactures the eUICC, the eUICC manufacturer could generate the MDK and securely store the MDK in the eUICC as noted above, and the eUICC manufacturer could additionally store an encrypted copy of the MDK securely in a blockchain through use of blockchain encryption techniques now known or later developed. Thereafter, if the eUICC manufacturer sells the eUICC to a device manufacturer for the device manufacturer to embed the eUICC into a host device, the eUICC manufacturer could convey the MDK securely through the blockchain to the device manufacturer, much like Bitcoin can be securely conveyed through a blockchain from one party to another.

Likewise, if the device manufacturer initially securely stores the MDK in the eUICC, the device manufacturer could additionally store an encrypted copy of the MDK securely in a blockchain through similar techniques and could convey the MDK securely through the blockchain to a next device owner, such as a device distributor or enterprise/user. Further, the next device owner could then similarly convey the MDK securely through the blockchain to another next device owner.

In a specific example scenario, the eUICC manufacturer could thus securely convey the MDK via the blockchain to the device manufacturer, the device manufacturer could then securely convey the MDK via the blockchain to a device distributor (e.g., MNO), and the device distributor could then securely convey the MDK via the blockchain to an end-user (or enterprise). Further, if the end-user then sells the device to another party, the end-user could likewise securely convey the MDK to that other party via the blockchain, and so forth.

To facilitate this conveying of the MDK via the blockchain, each party in the chain of custody of the MDK could make use of a blockchain client (e.g., a generic or special-purpose blockchain client application running on a networked computer) to send/receive the MDK. Much like a person could use a Bitcoin wallet to securely receive and send Bitcoin, the MDK could thus be securely conveyed from one party to another.

Advantageously, this use of a blockchain to convey the MDK from one party to another may establish verifiability of the MDK-transfer to each successive party. Further, use of the blockchain may also help avoid deniability of the transfer of the MDK from one party the next, as the transfer of the MDK between parties in the chain of custody would become part of the permanent blockchain ledger/history.

In a further implementation, as noted above, the eUICC could be configured to facilitate different levels of profile-deletion access associated with different MDK entry. Advantageously, this implementation could give the device owner a particular level of profile-deletion access and could give an OEM another, different level of profile-deletion access. For instance, the device owner could be given access to delete from the eUICC any or all operational profiles but not any non-operational profiles, whereas an OEM could be given access to delete from the eUICC any profiles, including both operational profiles and non-operational profiles.

To facilitate this, at manufacture, the device OEM or eUICC OEM could create multiple distinct MDKs for the eUICC and could securely store each of the MDKs in the device and/or eUICC along with data and/or program logic that specifies the level of profile-deletion access associated respectively with the MDK. For instance, the OEM could store each MDK in an ECASD or other eUICC component with a table or database arrangement along with data that specifies respectively for each MDK what the level of profile-deletion access is.

The eUICC could thus be configured to grant differential levels of profile-deletion access based on which of these MDKs is entered.

For instance, the eUICC operating system could be configured to receive input a profile-deletion request entered via a local user interface of the host device or, in the case of an OEM working to refurbish the eUICC, perhaps through a direct workbench/jig connection to the eUICC. This profile-deletion request could request deletion of one or more profiles from the eUICC, such as by specifying one or more profiles by profile-ID, or generally specifying all operational-profiles or all profiles (including both operational and non-operational), perhaps as a reset request or the like. And if a delete key for the profile-deletion request is not provided with the received request, the operating system could then prompt for entry of a delete key.

Upon receipt of a delete key for the profile-deletion request, the operating system could then query or otherwise reference data in the ECASD or other eUICC component that securely holds the MDKs, to determine (i) if the received delete key matches one of the securely-stored MDKs and (ii) if so, what level of profile-deletion access is associated with that MDK.

If the operating system thereby determines that delete key does not match any of the stored MDKs, then the operating system could reject the profile deletion request and thus not delete any profiles (or could allow deletion of just any operational profiles that are not set to not be deleted). Whereas, if the operating system determines that the delete key matches one of the stored MDKs, then the operating system could further determine whether the requested profile-deletion is encompassed by the level of profile-deletion access associated with the matching MDK. If the requested profile-deletion is not within the level associated with the matching MDK, then the operating system could then reject the profile-deletion request or could perhaps grant the request only to the extent allowed by the matching MDK. Whereas, if the requested profile-deletion is within the level associated with the matching MDK, then the operating system could grant the profile-deletion request by deleting the one or more profiles that the request asks to be deleted.

Advantageously with this arrangement, as noted above, the OEM could be given access to delete from the eUICC all profiles, including any/all operational profiles and any/all non-operational profiles, including any profiles that are set to not be deleted. The OEM could use this access when refurbishing the eUICC or the device for resale. For instance, the OEM could delete all operational profiles and non-operational profiles and could then provision new non-operational profiles, which could help overcome any possible corruption of existing non-operational profiles or the like.

On the other hand, the device owner in this arrangement could suitably be given access to delete from the eUICC any operational profiles, including any that are set to not be deleted. Thus, the device owner could control whether the device can be reconfigured to be served by a new network, even if an existing profile enabled on the eUICC has PPR4 or another such rule set.

FIG. 1 is a simplified block diagram depicting an example structure of an eUICC operable in accordance with the present disclosure. As shown in FIG. 1, the example eUICC includes a communication interface 12, at least one processing unit 14, and at least one machine-readable medium 16, which could be integrated and/or communicatively linked together on an integrated circuit card configured for mounting on a host device (e.g., mobile communication device) system board, or could be currently mounted on the host device system board. The eUICC could be referred to as a UICC that is configured to be embedded or could be referred to as an embedded UICC, whether or not currently embedded.

The communication interface 12 could include one or more physical connections (e.g. pins) for interfacing with the host mobile device and/or to facilitate direct connections (e.g., bench/jig connections to provision the eUICC during manufacture or refurbishment), so as to support communication between the eUICC and the host device. The at least one processing unit 14 could comprise one or more microprocessors and/or other types of processors, one or more of which could be configured to carry out various disclosed operations. And the at least one machine-readable medium 16 could comprise one or more memory or other storage components, including for instance rewriteable and/or non-rewriteable storage.

The at least one machine-readable medium 16 of the eUICC is configured to hold profiles 18, including at least one operational profile and at least one non-operational profile. For instance, the machine-readable medium could have a dedicated, secure storage space for holding these profiles and/or could be generally configured for storage and could thus facilitate storage of these profiles. In an example implementation, the at least one non-operational profiles could include a provisioning profile and perhaps a test profile as discussed above and might be encoded, stored, or otherwise provided on the machine-readable medium at the time of eUICC and/or host device manufacture, by an OEM or other entity. Whereas, each of the at least one operational profile could be an MNO profile (e.g., defining respective data for a service subscription that is specific to a respective MNO) downloaded or otherwise installed on the eUICC, perhaps after initial manufacture, as discussed above.

In addition, in line with the discussion above, an operational profile of the at least one operational profile has an associated profile policy rule (e.g., defined upon provisioning of the profile or subsequently) that specifies that the operational profile is to not be deleted from the eUICC.

Further, the machine-readable medium is similarly configured to hold one or more distinct reference delete key data 20, including a first reference delete key (e.g., MDK) and a different, second reference delete key (e.g., MDK), along with an indication (correlation) per reference delete key of an respective associated level of profile-deletion access, including defining access to bypass the profile policy rule that specifies that the operational profile is to not be deleted.

In line with the discussion above, the machine-readable medium could define an ECASD for holding such delete-key data. As noted above, these reference delete keys could be stored on the eUICC at the time of manufacture, and a copy of each delete key (or an associated key in an asymmetric encryption implementation) could be provided to a suitable party. Further, each of the reference delete keys is randomly generated so as to not be algorithmically reproducible. And the eUICC could be configured to not allow extraction of these reference delete keys from the eUICC (such as by not being configured to allow extraction of the reference delete keys).

As further shown, the at least one machine-readable medium 16 of the eUICC holds program instructions 22, defining at least an operating system of the eUICC. The program instructions are executable by the at least one processing unit 14 to carry out various eUICC operations as described above for instance so as to enable the eUICC to provide differential profile-deletion control.

As discussed above, the instructions could be executable by the at least one processing unit to differentially control deletion of the profiles based on a delete key received via the communication interface. For instance, the when a delete key is entered in association with a profile-deletion request at a user interface of the host device or through an OEM connection with the eUICC, the communication interface could receive the delete key into the eUICC for evaluation by the processing unit.

Thus, if the delete key matches the first reference delete key (rather than the second delete key), then the processing unit could responsively allow deletion of all of the profiles including the at least one operational profile and the at least one non-operational profile. Whereas, if the delete key matches the second reference delete key (rather than the first delete key), then the processing unit could responsively allow deletion of the at least one operational profile but not the at least one non-operational profile.

More particularly, the act of controlling deletion of the profiles based on the delete key received via the communication interface could involve (i) making a determination of whether the received delete key matches one of the reference delete keys, (ii) if the determination is that the received delete key does not match any of the reference delete keys, then disallowing profile deletion, and (iii) if the determination is that the received delete key matches a given one of the reference delete keys, then allowing profile deletion in accordance with the level of profile-deletion access associated with the matching reference delete key.

Thus, per the discussion above, the one delete key could allow deletion of any/all operational and non-operational profiles from the eUICC, whereas another delete key could allow deletion of just any/all operational profiles from the eUICC.

Another implementation of could be directed to the host device containing the eUICC, such as a host mobile communication device or other device having a system board onto which the eUICC is mounted or otherwise connected. Such a host device could include a user interface through which to receive user entry of a profile-deletion request (such as an eUICC and/or device reset request) with an associated delete key, possibly directed to one or more specific profiles stored on the eUICC and/or generally seeking deletion of profiles to the extent allowed by the delete key provided in association with the request.

Further, another implementation could be directed to an eUICC embedded in a host device and configured to allow deletion from the eUICC of an MNO profile that is set with a profile policy rule to not delete from the UICC of the MNO profile. The eUICC could be arranged as noted above.

More particularly, the UICC could comprise a communication interface, at least one processing unit, and at least one machine-readable medium holding the MNO profile that is set with the profile policy rule, the at least one machine-readable medium further holding a reference delete key that is randomly generated so as to not be algorithmically reproducible, and holding instructions executable by the at least one processing unit to carry out operations such as those described above. Namely, the operations could include (i) receiving through the communication interface a profile-deletion request requesting deletion of at least the MNO profile, and receiving in association with the profile-deletion request a request delete key, (ii) making a determination of whether the received request delete key matches the reference delete key, and (iii) granting the profile-deletion request only if the determination is that the received delete key matches the reference delete key, wherein granting the request overcomes the profile policy rule to not delete the MNO profile. Other features discussed above could be provided in this context as well, or vice versa.

Figure 2:
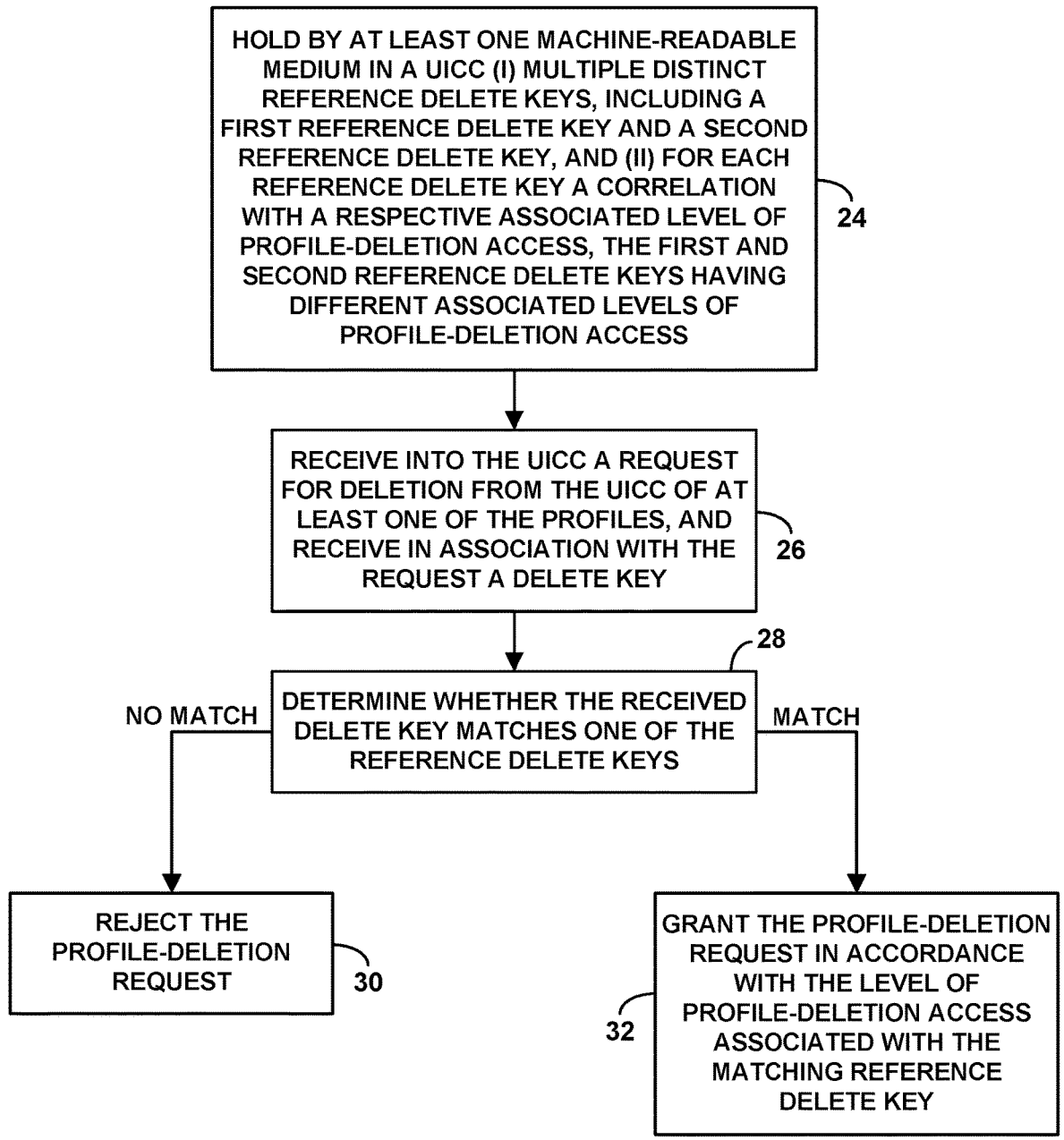
FIG. 2 is a flow chart depicting a method operable in accordance with the disclosure.

FIG. 2 is next a flow chart depicting various operations in accordance with the present disclosure. These operations could be carried out by a representative UICC to provide for differential profile-deletion control in the UICC when the UICC is embedded in a host device, the UICC including a communication interface, at least one processing unit, and at least one machine-readable medium holding profiles including at least one operational profile and at least one non-operational profile.

As shown in FIG. 2, at block 24, the method includes holding by the at least one machine-readable medium (i) multiple distinct reference delete keys, including a first reference delete key and a second reference delete key, and (ii) for each reference delete key a correlation with a respective associated level of profile-deletion access, where the first and second reference delete keys have different associated levels of profile-deletion access. For instance, the first reference delete key could allow deletion of all of the profiles including the at least one operational profile and the at least one non-operational profile, and the second reference delete key could allow deletion of the at least one operational profile but not the at least one non-operational profile. And in line with the discussion above, each of the reference delete keys could be randomly generated so as to not be algorithmically reproducible.

Further, at block 26, in parallel with the operations of block 24, the method includes receiving into the UICC through the communication interface a request for deletion from the UICC of at least one of the profiles (e.g. a reset request), and receiving in association with the request a delete key. At block 28, the method then includes, responsive to the received request, making a determination of whether the received delete key matches one of the reference delete keys. And at blocks 30-32, the method includes taking action based on the determination. Namely, at block 30, the method includes, if the determination is that the received delete key does not match any of the reference delete keys, then rejecting the profile-deletion request (e.g., providing a response that disallows the profile-deletion request). And at block 32, the method includes, if the determination is that the received delete key matches a given one of the reference delete keys, then granting the profile-deletion request in accordance with the level of profile-deletion access associated with the matching reference delete key.

In line with the discussion above, at least one operational profile on the UICC could have an associated profile policy rule that specifies that the operational profile is to not be deleted, and the first reference delete key and second reference delete could each define access to bypass that profile policy rule, so as to allow deletion of the operational profile notwithstanding the profile policy rule.

Exemplary embodiments have been described above. Those skilled in the art will understand, however, that changes and modifications may be made to these embodiments without departing from the true scope and spirit of the invention.

We claim:

1. A method of securely controlling a delete key useable to facilitate deleting profile data from an embedded universal integrated circuit card (eUICC), wherein the eUICC is configured to securely store communication profiles and to securely store a reference key defining an access right for deleting one or more of the profiles from the eUICC, and wherein the eUICC includes a processing unit configured (i) to receive the delete key with a profile-deletion request requesting deletion from the eUICC of at least one of the profiles, (ii) to responsively make a determination of whether the received delete key matches the stored reference key and (iii) responsive to the determination being affirmative, to allow deletion of the at least one profile per the deletion-request, the method comprising:

securely storing the delete key in a blockchain; and securely conveying the delete key through the blockchain from a first party to a second party, wherein after receipt of the delete key by the second party, the delete key is useable by the second party to gain access to delete one or more profiles from the eUICC.

2. The method of claim 1, wherein the first party is a distributor of a host device containing the eUICC, and wherein the second party is a party who receives the host device from the distributor.

3. The method of claim 1, wherein there is at least one recipient of the delete key in a chain of custody between the first party and the second party.

4. The method of claim 1, wherein the blockchain is used to securely convey the delete key (i) from a manufacturer of the eUICC to a manufacturer of a host device containing the eUICC and (ii) from the manufacture of the host device to a next owner of the host device.

* * * * *